(12) United States Patent  
Halverson et al.

(10) Patent No.: US 7,163,002 B1  
(45) Date of Patent: Jan. 16, 2007

(54) FUEL INJECTION SYSTEM AND METHOD

(75) Inventors: Jon Halverson, Dearborn, MI (US); Xiaoying Zhang, Dearborn Heights, MI (US); Sue Wagers, Newport, MI (US); Mark Linenberg, Dearborn, MI (US); Mike Scannell, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/367,501

(22) Filed: Mar. 2, 2006

(51) Int. Cl. *F02D 41/06* (2006.01)

(52) U.S. Cl. ............ 123/491; 123/480; 123/494; 701/104

(58) Field of Classification Search ........ 123/406.47, 123/435, 436, 478, 480, 491, 494; 701/103, 701/104, 113  
See application file for complete search history.

(56) References Cited

U.S. PATENT DOCUMENTS

| | | | |
|---|---|---|---|
| 5,492,101 A | 2/1996 | Saito et al. | |
| 5,572,978 A * | 11/1996 | Ogawa | 123/491 |
| 5,586,537 A * | 12/1996 | Tomisawa et al. | 123/435 |
| 5,647,324 A | 7/1997 | Nakajima | |
| 5,875,759 A | 3/1999 | Meyer et al. | |
| 5,878,717 A * | 3/1999 | Zur Loye | 123/435 |
| 6,079,396 A * | 6/2000 | Ament et al. | 123/491 |
| 6,176,222 B1 * | 1/2001 | Kirwan et al. | 123/492 |
| 6,360,726 B1 * | 3/2002 | Javaherian | 123/491 |
| 6,474,307 B1 | 11/2002 | Ohuchi et al. | |
| 6,679,225 B1 * | 1/2004 | Robertson et al. | 123/436 |
| 6,817,342 B1 * | 11/2004 | Schule | 123/491 |
| 6,935,311 B1 * | 8/2005 | Visser et al. | 123/494 |
| 6,935,312 B1 * | 8/2005 | Murase et al. | 123/491 |
| 2005/0224055 A1 * | 10/2005 | Wiese et al. | 123/494 |

FOREIGN PATENT DOCUMENTS

| | | | |
|---|---|---|---|
| EP | 001223326 A2 * | 7/2002 | |
| JP | 09144591 A * | 6/1997 | |

* cited by examiner

*Primary Examiner*—T. M. Argenbright  
(74) *Attorney, Agent, or Firm*—Allan J. Lippa; Alleman Hall McCoy Russell & Tuttle LLP

(57) ABSTRACT

A method for adjusting fuel injection, the method comprising during an engine start from a non-warmed-up condition, identifying a fuel quality of fuel supplied to the engine during said start based on a performance of said start, and after said start is completed and during a transient fueling condition, adjusting a fuel injection amount based on said identified fuel quality from said start.

8 Claims, 4 Drawing Sheets

FUEL INJECTION SYSTEM AND METHOD

BACKGROUND AND SUMMARY

Engines utilize various types of fuel injection adjustments to provide improved engine performance. One example fuel injection compensation methods increases or decreases fuel injection to account for fuel adhered to walls of the intake manifold, intake valves, and/or intake ports. Such phenomena may be referred to as wall wetting dynamics, or transient fuel dynamics. To compensate for such dynamics, the amount of fuel injected is varied to compensate for the fuel stored in the intake manifold and intake ports based on various models and estimates taking into account engine operating conditions. In this way, more accurate air/fuel ratio control may be achieved in of the combusted air/fuel mixture.

One example of fuel injection control is described in U.S. Pat. No. 5,492,101. In this example, a transient fuel compensation is described that uses an atomized fuel behavioral model, intake passage fuel behavioral model, and a combustion fuel behavioral model to adjust fuel injection and control actual air/fuel ratio in the combustion chamber. Specifically, the approach utilizes a fuel property value (NF) in the intake passage behavioral model.

The inventors herein have recognized several issues with the above approach. First, there may be numerous fuel properties that may be included in the model, some of which may have an influence of increasing fuel injection compensation while others have an influence of decreasing fuel injection compensation. Second, the inventors herein have also recognized that the determination of fuel properties may require additional sensors, thus increasing costs.

In one embodiment, the above issues may be addressed by utilizing fuel volatility to adjust transient fuel injection, where the fuel volatility is determined during previous engine start-up operation. For example, Applicants have recognized that fuel volatility and/or quality can have an impact on air-fuel control during transient fueling conditions by affecting the amount of fuel stored in the intake manifold and ports, the rate of storage, and/or the rate of release. Further, by determining fuel volatility during a start, it is possible to determine an indication of fuel volatility by monitoring engine run-up speed.

DETAILED DESCRIPTION

Figure 1:
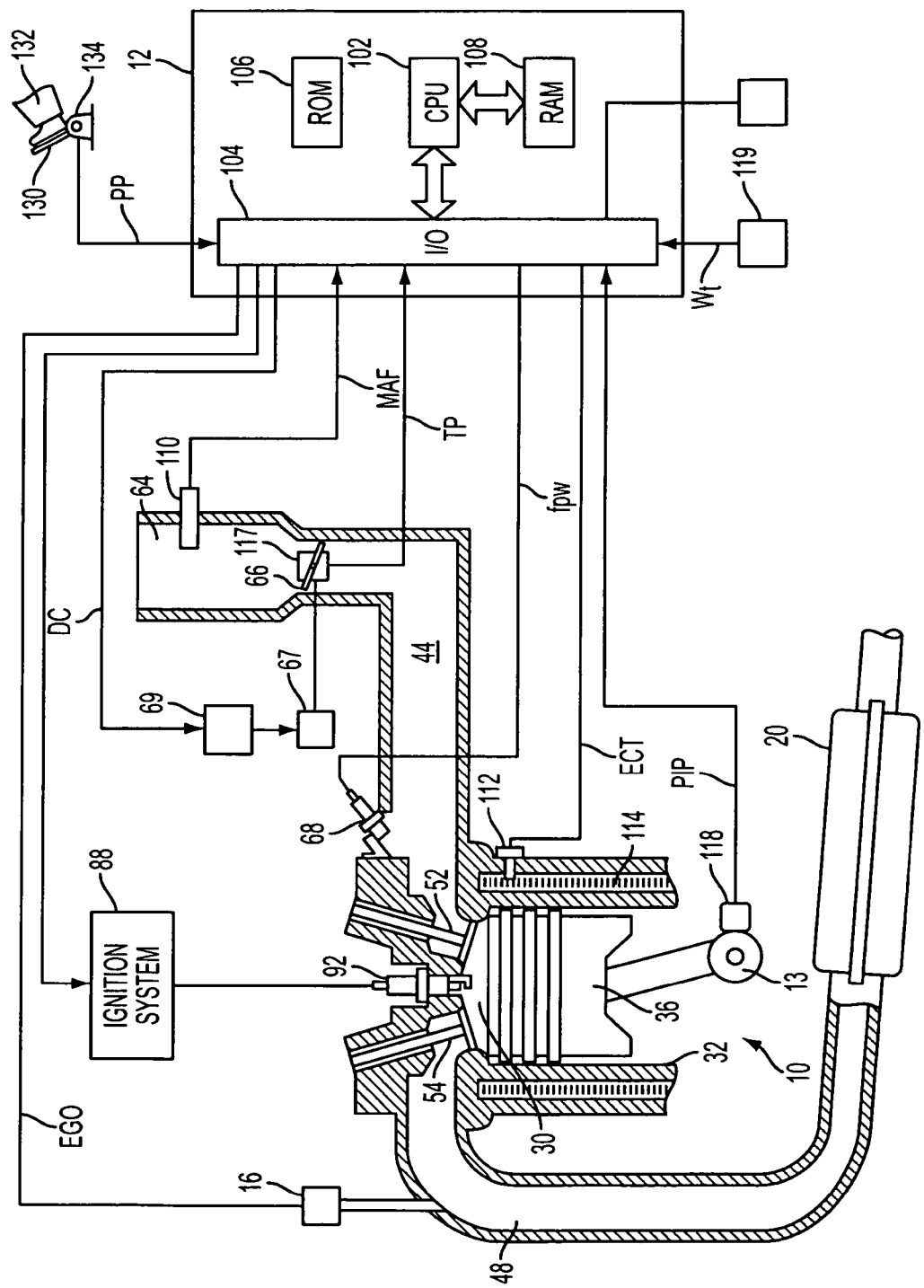
FIG. 1 is a block diagram of a vehicle illustrating various powertrain components.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of the transmission input shaft, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular control strategy being used. Further, these Figures graphically represent code to be programmed into the computer readable storage medium in controller 12.

Figure 2:
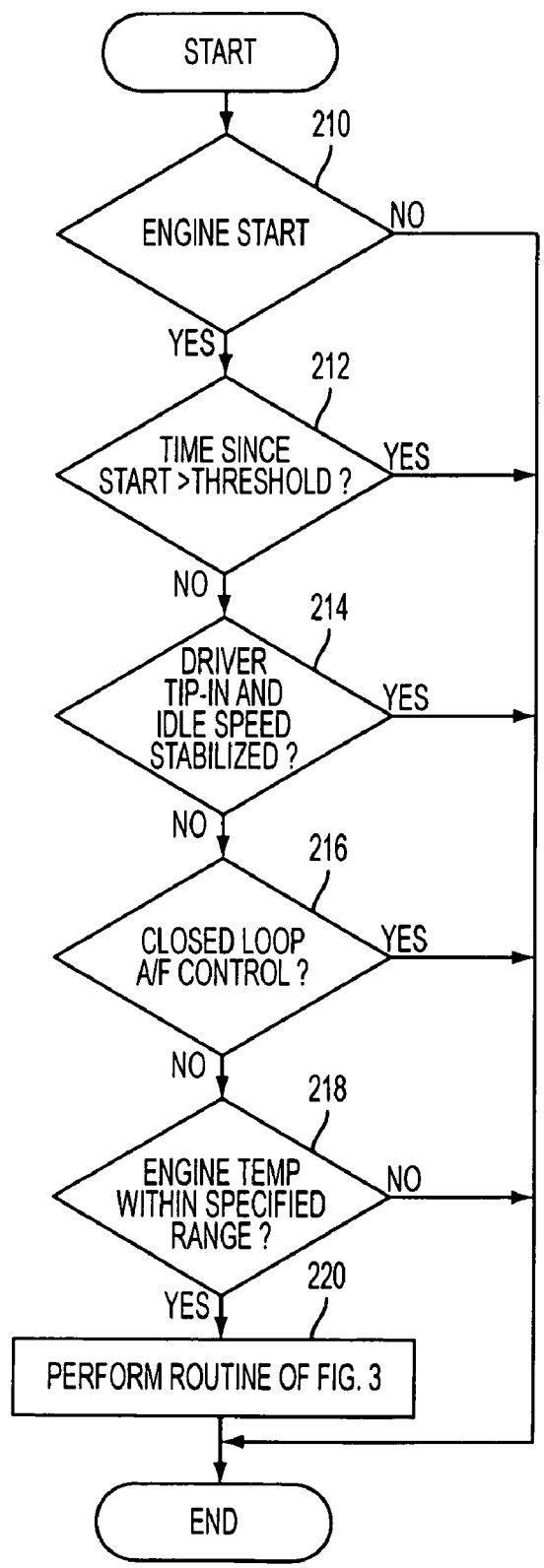
FIGS. 2–4 are high level flowchart of routines for controlling the engine and fuel injection.

Referring now to FIG. 2, a routine is described showing when a fuel volatility/ or fuel quality determination may be performed. In 210, the routine first determines whether an engine start is present. For example, an engine start may be determined via the engagement of an engine starter motor, monitoring whether engine speed is greater than a minimum engine speed, a driver key position or various others. When answer to 210 is yes, the routine continues to 212. In 212, the routine determines whether the time since the engine start is greater than a threshold value. The time since the engine start may be determined in various ways such as, the amount of time after the engine has reached a minimum speed such as 250 rpm. When the answer to 212 is no, the routine continues to 214. In 214, the routine determines whether a driver tip-in has occurred and whether the engine idle speed is stabilized. A driver tip-in can be determined in various ways such as, based on whether the driver accelerator pedal position is greater than a threshold value. Further, stable engine idle speed may be determined by comparing the measured engine idle speed to the desired engine idle speed and determine whether it has remained within a given threshold for a given number of engine cycles. If the answer to 214 is no, the routine continues to 216. In 216 the routine determines whether close loop air/fuel ratio control is enabled. For example, the routine may determine whether exhaust gas oxygen sensors have reached a desired operating temperature, in which case fuel injection is adjusted based on feedback from the exhaust gas oxygen sensors. If the answer to 216 is no, the routine continues to 218. In 218, the routine determines whether the engine temperature, such as the engine coolant temperature (ECT) is within a specified operating window. If the answer to 218 is yes, the routine continues to 220 to perform the routine of FIG. 3.

Alternatively, in each of the above cases, the routine continues to the end.

Figure 3:
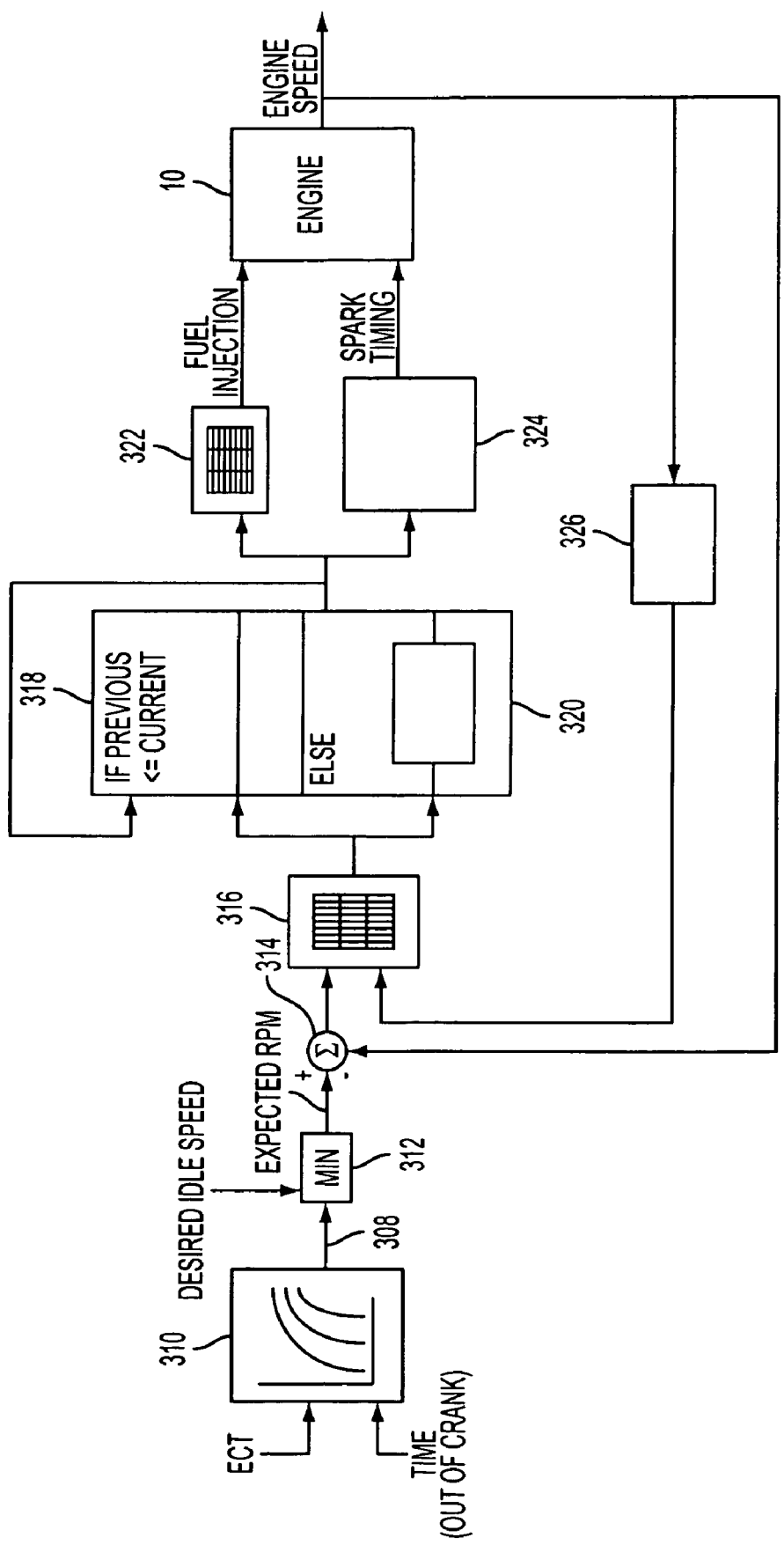

Turning now to the control strategy depicted in FIG. 3, a routine for determining a parameter indicative of fuel volatility is described. Alternatively, various other determinations may be made, such as based on a fuel quality sensor, such as fuel density, viscosity, or combinations thereof. In general, the routine of FIG. 3 uses a proportional and derivative speed feedback control to compensate for variations in fuel volatility during an engine start, where the deviation between an expected and actual engine run-up speed profile is used as an indication of the fuel volatility.

Continuing with FIG. 3, the first step is to calculate the expected engine speed run-up profile. In this example, the expected speed is determined as a minimum of two parameters at 312. The first parameter 308 is determined at 310 as a function of engine coolant temperature (ECT), which is represented by the average ECT during the engine start and time out of engine cranking. The time out of engine cranking, or time since start can be, for example, a timer starting after engine speed reaches a minimum threshold, such as approximately 250 RPM. The second variable is a desired idle RPM value, which may be determined by an idle speed control routine (not shown).

Next, the expected engine speed is compared with the actual engine speed at the summing junction of 314. The result of this comparison and an approximate derivative of measured engine speed (e.g., the filtered slope of the speed curve) from 326 are fed to 316. An example filter that may be used to approximate the derivative is a simple first order filter. In 316, the input values are used to calculate a fractional value (from 0 to 1), where 1 is the maximum output and 0 is the minimum output. The output is then fed to 318 and 320 and filtered depending on the direction of the change. If the output is increasing, no filtering is used (318); however, if the output is decreasing, a simple first order low-pass filter may be used (320). The output of 318/320 is a parameter indicative of a fuel quality, such as the amount of hesitation type fuel present during the start.

This parameter may then be used to adjust engine operation, such as to adjust a fuel injection amount and/or spark timing via 322 and 324, respectively. For example, this parameter indicative of fuel quality may be used to adjust the desired air-fuel ratio and spark timing. In one example, the parameter is used to adjust the desired air-fuel ratio by increasing the richness of the air-fuel ratio as the parameter increases, where various levels of gain may be used depending on operating conditions. The spark timing may be adjusted by blending spark timing between a base timing (for starting with a minimum fuel quality level) and a maximum limit on spark timing after which torque is reduced.

In this way, the potentially lean combustion caused by degraded fuel quality may be compensated by richening the fuel injection and advancing spark timing (from its retarded value during an engine start to provide rapid catalyst heating).

Figure 4:
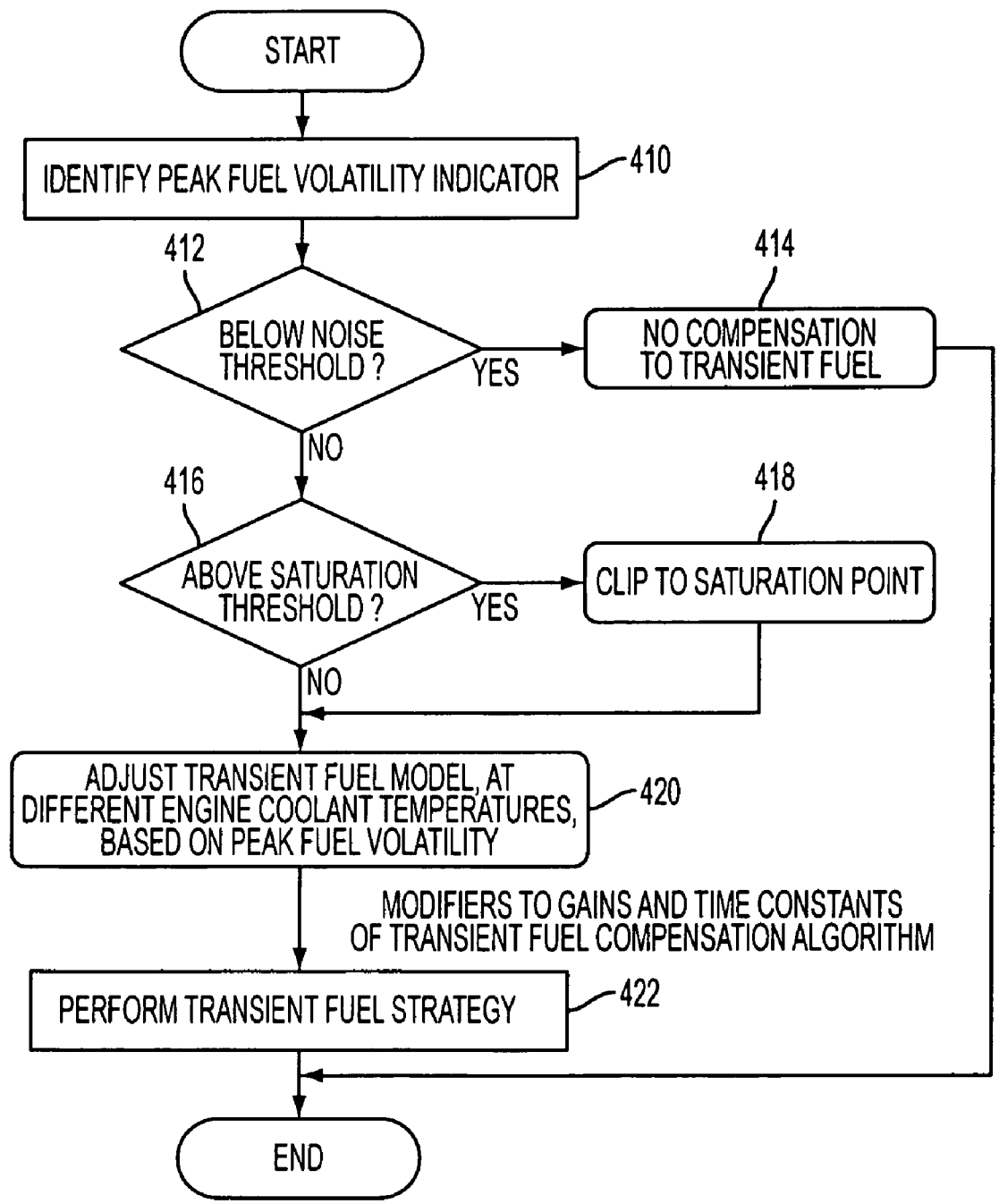

Referring now to FIG. 4, a routine is described for utilizing the parameter indicative of fuel quality or fuel volatility in adjusting a transient fuel adjustment. First, in 410, the routine identifies the peak, or maximum, fuel volatility parameter output from blocks 318–320 of FIG. 3 during the most recent engine start. Alternatively, rather than using the most recent engine start value the routine may average a plurality of previous engine start fuel volatility parameters to identify the peak fuel volatility indication in 410. Next, in 412, the routine determines whether the peak value of 410 is below a minimum noise threshold. If so, the routine continues to 414, and no compensation to the transient fuel adjustment values are made, and the routine continues to the end.

Alternatively, when the answer to 412 is no, the routine continues to 416. In 416, the routine determines whether the peak value from 410 is above a saturation threshold value. If so the routine continues to 418 to clip the fuel volatility parameter to a maximum saturation value. From either 418, or when the answer to 416 is no, the routine continues to 420. In 420, the routine determines various adjustments to transient fuel parameters at different engine coolant temperatures, for example. For example, the routine may adjust a ratio of injected fuel that is stored in the intake manifold for a given coolant temperature based on the detected peak fuel volatility indication. Alternatively, or in addition, the routine may also adjust the ratio of fuel evaporating from puddles in the intake manifold or intake ports that is inducted into a cylinder during the induction stroke based on the peak volatility parameter. Still further, other adjustments to gains and/or time constant of the transient fuel compensation algorithms can be made based on the peak detected fuel volatility indication from FIG. 3.

Continuing with FIG. 4, in 422, the routine performs the transient fuel calculation and fuel injection adjustment based on engine operating parameters.

In this way, it is possible to adjust transient fuel injection adjustment to account for variations in fuel quality where the fuel quality may be identified during an engine start.

In one embodiment, the captured volatility information may be used even during the engine start, although the final maximum value over the entire start is not yet identified. In other words, the routine may use the maximum value up to the current conditions during a start to adjust transient fuelling operation. Alternatively, the routine may wait to identify the maximum value before enabling adjustment of transient fuelling operation after the engine start.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for adjusting fuel injection, the method comprising:
   during an engine start from a non-warmed-up condition, comparing expected engine speed for current starting conditions with measured engine speed, adjusting a fuel injection amount during said start based on said comparison to compensate for fuel volatility, and identifying a peak fuel volatility adjustment;
   identifying a fuel quality of fuel supplied to the engine during said start based on said peak adjustment and previous peak adjustments from previous starts; and
   during said start or after said start is completed and during a transient fueling condition, adjusting a fuel injection amount based on said identified fuel quality.

2. The method of claim 1 wherein an estimate of fuel adhered to an intake system is determined based on said identified fuel quality from said start.

3. The method of claim 2 wherein an estimate of fuel entering a cylinder that was adhered to said intake system is determined based on said identified fuel quality from said start.

4. The method of claim 3 wherein an amount of increase in fuel injection beyond that needed to match airflow is determined based on said identified fuel quality.

5. The method of claim 4 wherein an amount of decrease in fuel injection beyond that needed to match airflow is determined based on said identified fuel quality.

6. The method of claim 5 wherein said fuel quality is a fuel volatility.

7. The method of claim 3 wherein said current starting conditions include engine coolant temperature and barometric pressure.

8. A method for adjusting fuel injection, the method comprising:
   during an engine start from a non-warmed-up condition, comparing expected engine speed for current starting conditions with measured engine speed, adjusting a fuel injection amount during said start based on said comparison to compensate for fuel volatility, and identifying a peak fuel volatility adjustment;
   identifying a fuel quality of fuel supplied to the engine during said start based on said peak adjustment and previous peak adjustments from previous starts; and
   during said start and after said start is completed and during a transient fueling condition, adjusting a fuel injection amount based on said identified fuel quality when said peak adjustment is greater than a minimum value.

* * * * *